Jan. 18, 1938.                C. F. DENNEY                2,105,523
                              OIL REFINING
                          Filed Nov. 20, 1931          2 Sheets-Sheet 1

INVENTOR
Courtlandt Forrest Denney
BY
William F. McKnight
his ATTORNEY

Patented Jan. 18, 1938

2,105,523

UNITED STATES PATENT OFFICE 2,105,523

OIL REFINING

Courtlandt Forrest Denney, New York, N. Y., assignor to Foster Wheeler Corporation, New York, N. Y., a corporation of New York Application November 20, 1931, Serial No. 576,341

11 Claims. (Cl. 196—70)

My invention relates to the art of treating and refining hydrocarbon oils. More particularly, my invention relates to a process for treating oils of this nature including vapor phase cracking.

One of the objects of my invention is to submit oil in the vapor phase to a temperature suitable for causing cracking of the oil vapor in order to obtain desired products. This cracking is accomplished by introducing oil vapor into the lower part of a cracking tower which is provided with a series of baffles or bubble trays. An auxiliary liquid, inert with respect to the oil and having a melting point below the lowest temperature desired for cracking and a boiling point above this temperature is introduced into the top of the tower. The auxiliary liquid passes downwardly over the bubble trays or baffles in direct contact with the oil vapors and thus heats them to the proper temperature for cracking.

Another object of my invention is to provide means for recycling a portion of the product obtained from the cracking tower back through the cracking tower along with the new charge.

Figure 1:
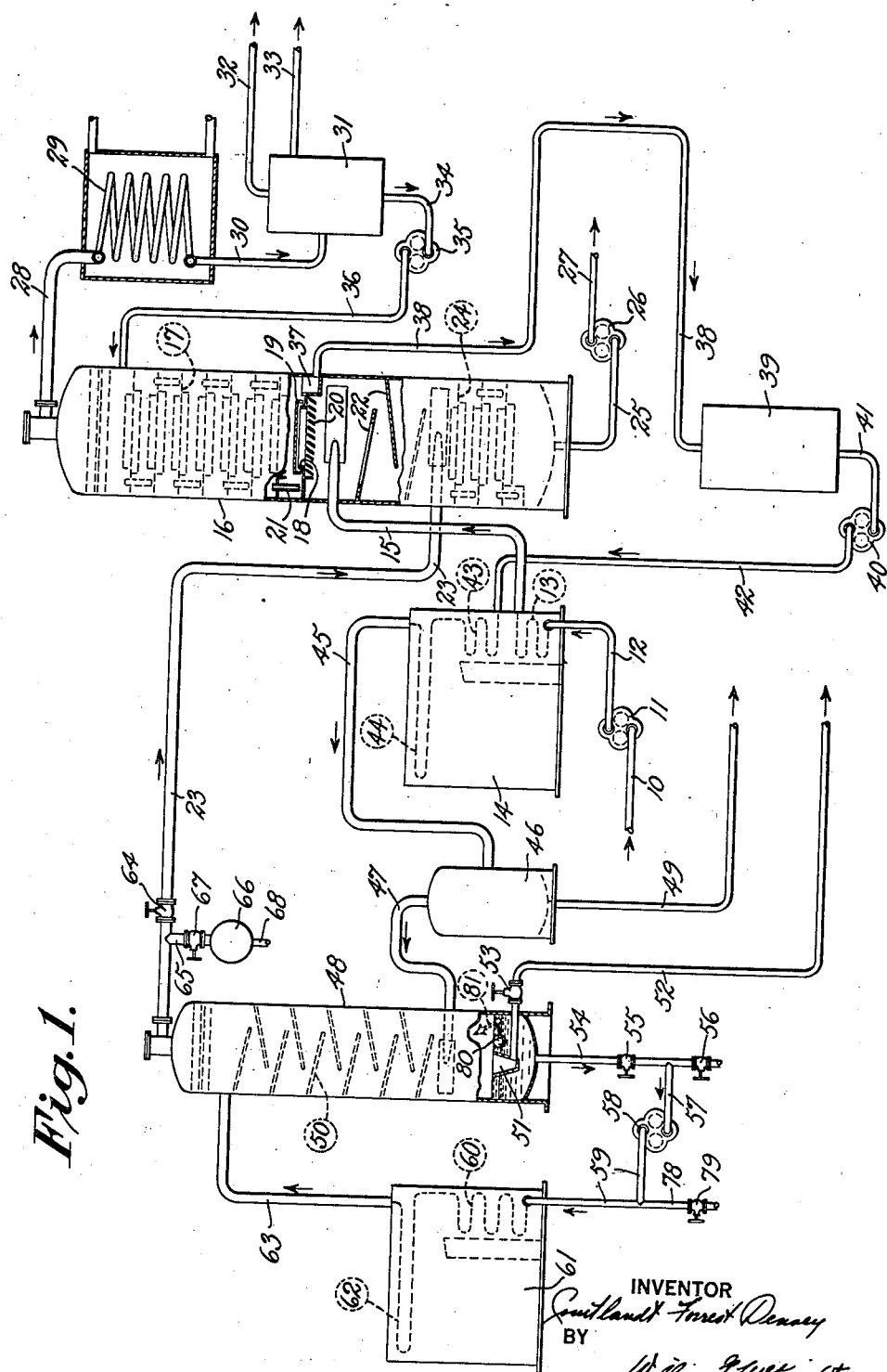
Figure 2:
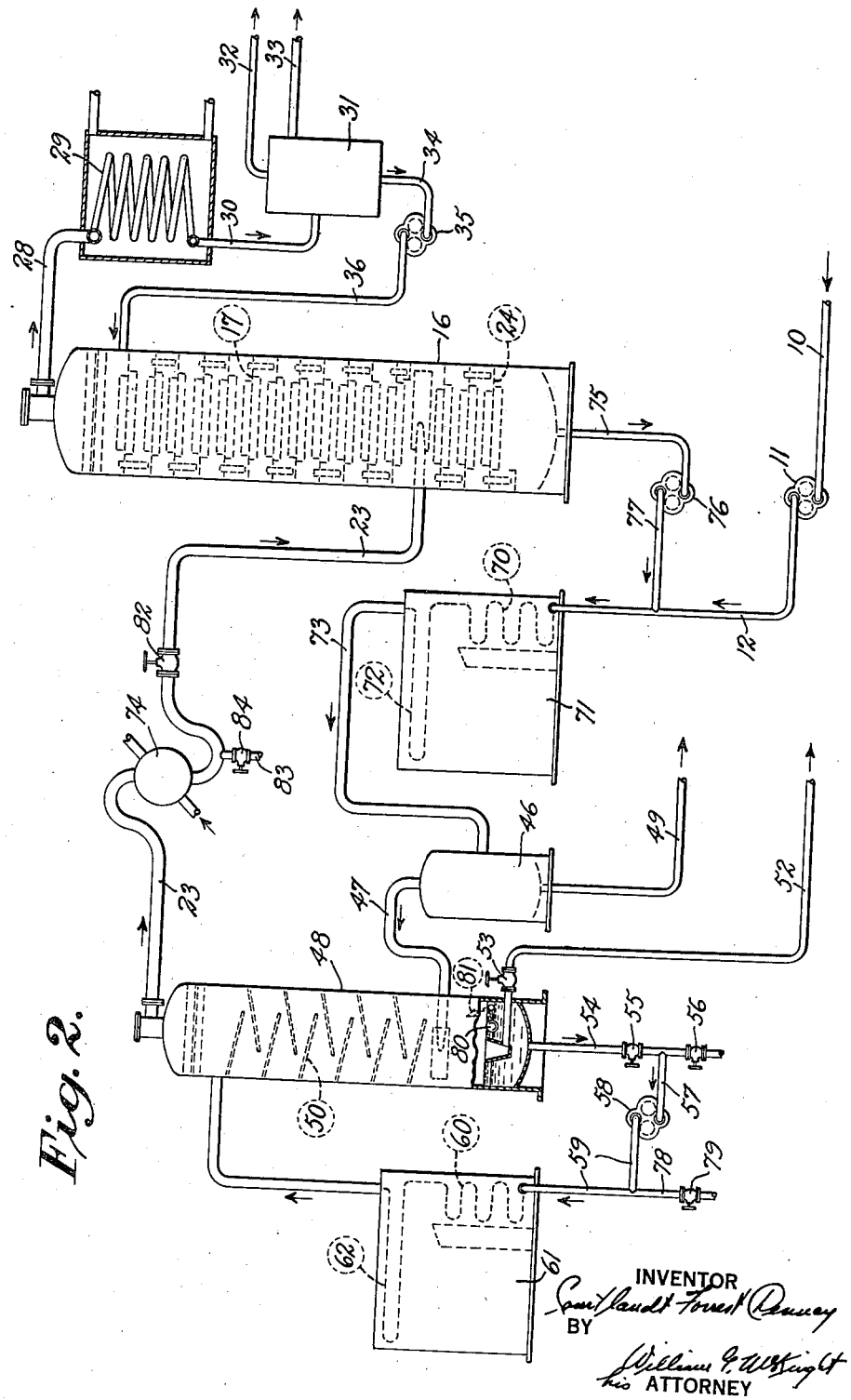

Further objects and advantages of my invention will be apparent from the following description read in connection with the accompanying drawings which form a part of this specification and on which:

Fig. 1 is a view, partly in cross-section, showing one embodiment of my invention; and Fig. 2 is a view, partly in cross-section, of a somewhat modified embodiment.

Referring more particularly to Fig. 1, reference character 10 designates a conduit through which is supplied oil to be treated. A pump 11 forces the oil from conduit 10 through a conduit 12 to a bank of convection tubes 13 located in an oil heater 14. From the tubes 13 the heated oil is supplied through a conduit 15 to a fractionating tower 16.

Conduit 15 communicates with tower 16 at a point near the center thereof. Above this point tower 16 is provided with a series of bubble trays 17. Bubble trays 17 comprise vapor uptakes 18 covered with bubble caps 19 and liquid separators 20 may be provided below the trays. Conduits 21 convey liquid downwardly from one bubble tray to the next below. Below the point of communication of conduit 15, tower 16 is provided with a series of inclined baffles 22. Below baffles 22 a conduit 23 communicates with the tower and below conduit 23 there is a series of bubble trays 24 which may be similar to bubble trays 17 in the upper part of the tower. A conduit 25 communicates with the bottom of tower 16 and leads to a pump 26 which discharges through a conduit 27 to storage.

A conduit 28 communicates with the upper part of tower 16 and leads to a condenser 29 which is connected by means of a conduit 30 to a gas and liquid separator and reflux tank 31. A vapor conduit 32 communicates with the top of tank 31 while a liquid conduit 33 communicates with the upper part of the tank. The bottom of the tank is connected by means of a conduit 34 to a reflux pump 35 which discharges through a conduit 36 to the upper part of tower 16.

The lowermost bubble tray in the upper group designated by reference character 17 is provided with a liquid pocket 37. A conduit 38 communicates with the lower part of pocket 37 and leads to an accumulator tank 39. A pump 40 is connected to tank 39 by means of a conduit 41 and discharges through a conduit 42 to a bank of convection tubes 43 in heater 14. Tubes 43 are connected to radiant heat tubes 44 in the heater and these latter tubes are connected by means of a conduit 45 to a vapor separator 46. A vapor conduit 47 connects the top of separator 46 with a cracking contact tower 48. A conduit 49 communicates with the lower part of separator 46 and leads to storage.

The interior of cracking contact tower 48 is provided with a series of inclined baffles 50. The upper part of the cracking tower 48 is connected to conduit 23 which leads to the lower part of fractionating tower 16. Conduit 23 is provided with a valve 64. Between tower 48 and valve 64 a conduit 65 communicates with conduit 23 and leads to a condenser 66, conduit 65 being provided with a valve 67. Condensate from condenser 66 is discharged through conduit 68. A cup-shaped member 51 is located in the lower part of cracking tower 48. A conduit 52 provided with a valve 53 communicates with the bottom of member 51 and leads to storage. A float 80 may be provided in the lower part of tower 48 and arranged to operate an indicator 81 outside of the tower.

A conduit 54 communicates with the bottom of cracking tower 48 and is provided with valves 55 and 56. A conduit 57 communicates with conduit 54 between valves 55 and 56 and leads to a pump 58 which discharges through a conduit 59 to convection tubes 60 in a heater 61. Convection tubes 60 are connected to radiant heat tubes 62 in heater 61 which are connected by means of a conduit 63 to the upper part of cracking tower 48. A conduit 78 provided with a valve 79 communicates with a low point of conduit 59.

The operation of this embodiment of my invention is substantially as follows:

Crude oil supplied through conduit 10 is forced by pump 11 through conduit 12 to tubes 13 in heater 14, where the oil is heated and partially vaporized. The mixture of liquid and vaporous oil passes through conduit 15 to within fractionating tower 16. In tower 16 vaporous oil passes upwardly through the bubble trays and is acted upon and partially condensed by reflux liquid flowing downwardly over the bubble trays. The light fractions of the oil vapors are not condensed and pass out of the top of the tower through conduit 28 to condenser 29 where they are liquefied. The liquid oil from condenser 29 passes through conduit 30 to reflux tank 31. Any uncondensed gas is withdrawn through conduit 32 while a portion of the liquid oil is drawn off through conduit 33 to storage. Liquid is also withdrawn from reflux tank 31 through conduit 34 by means of reflux pump 35 and forced through conduit 36 to the upper part of fractionating tower 16 where it serves as reflux liquid.

The liquid flowing downwardly over the bubble trays 17 accumulates in pocket 37 and is led therefrom through conduit 38 to accumulator tank 39. From tank 39 the oil is withdrawn through conduit 41 by pump 40 and is forced through conduit 42 to tubes 43 and 44 in heater 14 where substantially all of the oil is vaporized. The oil discharged from tubes 44 passes through conduit 45 to liquid separator 46. The vaporous oil passes from separator 46 through conduit 47 to within the lower part of cracking contact tower 48. Any liquid separated from the oil vapor in separator 46 passes through conduit 49 to storage.

Tubes 60 and 62 in heater 61, conduit 56, tower 48, conduits 54 and 57, pump 58 and conduit 59 constitute a cycle for the circulation of an auxiliary heating medium. This heating medium should be of such a nature as to not react with the oil vapors present in tower 48 and must have a melting point below the temperature desired for cracking within the tower and a boiling point above this temperature. I have found that the following substances are suitable for use as an auxiliary heating medium: sodium hydrate, (NaOH), lead (Pb), phosphorous tri-sulphide (P$_2$S$_3$), phosphorous pent-sulphide (P$_2$S$_5$), tin (Sn), tin bromide (SnBr$_2$) and tin chloride (SnCl$_2$).

I particularly prefer to use sodium hydrate inasmuch as this compound is soluble in water and may be introduced into the cycle while cold in an aqueous solution through conduit 56. When this solution in tubes 60 and 62 is heated, the water is driven off as steam and passes through conduit 63 to tower 48 from whence it passes through conduit 23. While starting the apparatus and until all of the water has been driven from the aqueous solution, valve 64 is closed and valve 67 in conduit 65 is open so that the steam will pass into condenser 66 where it may be condensed. When the water has been driven from the solution leaving sodium hydrate in the cycle as a heating medium, valve 64 is open and valve 67 is closed.

The heating medium in liquid form heated in tubes 60 and 62 is supplied through conduit 63 to the upper part of cracking contact tower 48. The heating medium passes downwardly over baffles 50 within the tower and comes in intimate contact with the oil vapors introduced through conduit 47. The oil vapors are thus heated to the desired temperature and are thereby cracked. The vapors resulting from the cracking process are conveyed from the top of the tower through conduit 23 to the lower part of fractionating tower 16. In tower 16 the vapors pass upwardly around baffles 22 and upwardly through bubble trays 17 where they are treated by the reflux liquid passing downwardly over the bubble trays. Liquid introduced into tower 16 through conduit 15 passes downwardly through the tower in contact with the vapors rising from conduit 23 and finally are withdrawn from the bottom of the tower through conduit 25 and pumped to storage.

The liquid heating medium supplied to contact tower 48 accumulates in the lower part thereof and is withdrawn through conduits 54 and 57 by pump 58 and recirculated through the heater. Any liquid oil, such as coke and tar, resulting from the cracking within tower 48 has a less specific gravity than the heating medium and floats on top thereof in the lower part of the tower. The coke and tar overflows into member 51 from which it may be withdrawn through conduit 52. The buoyancy of float 80 is such that it will sink in the coke and tar, but will float on the heating medium. The heating medium should be withdrawn from the tower at such a rate as to maintain the line of demarcation between it and the coke and tar, as indicated by indicator 81, just below the top of member 51.

When it is desired to shut down the plant, the heating of heater 61 is stopped and after tubes 60 and 62 have become cooled somewhat, water is pumped into the system and dissolves the sodium hydrate, thus preventing it from solidifying, inasmuch as this substance is a solid at ordinary temperatures. If a heating medium is chosen, such as lead, which is not soluble in water, provision must be made for withdrawing the medium from the system when the apparatus is stopped. In this case a tank heater or the like may be provided into which the molten lead may be drained by opening valves 59 and 79 and allowed to there solidify. When the plant is to be started again the lead is melted in the tank heater and then pumped into the system.

In Fig. 2 there is shown a somewhat modified embodiment of my invention. Reference character 10 designates a conduit which supplies crude oil to pump 11 which forces the oil through conduit 12 to a bank of convection tubes 70 in a tube heater 71. Tubes 70 are connected to radiant heat tubes 72 which discharge through a conduit 73 to liquid separator 46. Conduit 47 connects the upper part of separator 46 to the lower part of the cracking contact tower 48. The interior of tower 48 is provided with a series of baffles 50. A conduit 49 communicates with the bottom of separator 46 and leads to storage.

The cycle for the circulation of auxiliary heating medium in the apparatus shown in Fig. 2 may be the same as that shown and described in connection with Fig. 1 and hence the description thereof need not be here repeated.

Conduit 23 communicates with the upper part of cracking tower 48 and leads to the lower part of fractionating tower 16. A cooler 74 is interposed in conduit 23 for the purpose of cooling the oil vapors passing therethrough. A valve 82 is placed in conduit 23 between cooler 74 and tower 16. A conduit 83 provided with a valve 84 communicates with a low point in conduit 23 between cooler 74 and valve 82.

Fractionating tower 16 is provided with a series of bubble trays 17 above the point of communication of conduit 23 with the tower and with a series of bubble trays 24 below this point. Conduit 28 connects the top of the fractionating tower with condenser 29 which discharges through conduit 30 to reflux tank 31. The lower part of reflux tank 31 is connected by means of conduit 34 with reflux pump 35 which discharges through conduit 36 to the top of tower 16.

A conduit 75 communicates with the bottom of fractionating tower 16 and leads to a pump 76 which discharges through a conduit 77. Conduit 77 is connected to conduit 12.

The operation of the above described apparatus is substantially as follows:

Crude oil supplied through conduit 10 is forced by pump 11 through conduit 12 to tubes 70 and 72 in heater 71. Bottoms removed from fractionating tower 16 through conduit 75 are forced by pump 76 through conduit 77 into conduit 12 where they mix with the fresh charge.

In tubes 70 and 72 the oil is substantially vaporized and passes through conduit 73 to liquid separator 46. Any unvaporized oil is withdrawn in liquid form from the bottom of the separator through conduit 49. The oil vapors pass from separator 46 through conduit 47 to the lower part of contact cracking tower 48. The oil vapors pass upwardly through tower 48 in contact with the heating medium which passes in liquid form downwardly through the tower, as was described in connection with Fig. 1. The oil vapors obtained from the cracking process in tower 48 pass through conduit 23 and are cooled somewhat in cooler 74. During normal operation of the apparatus valve 82 is open and valve 84 is closed. The cooled vapors are introduced into the lower part of fractionating tower 16 and pass upwardly through the bubble trays 17 therein where they are acted upon and partially condensed by the reflux liquid passing downwardly over the bubble trays. The oil which remains in vaporous form during its passage upwardly through the tower is withdrawn through conduit 28 and condensed in condenser 29 from where it is supplied to reflux tank 31. A portion of this oil is withdrawn through conduit 33 and led to storage while the remainder is refluxed through conduits 34 and 36 by pump 35 to the upper part of the fractionating tower. In passing downwardly over the bubble trays 17 a portion of the reflux liquid is vaporized and a portion of the oil vapors passing upwardly is condensed. The liquid which finally reaches the bottom of tower 16 constitutes the heavier fractions of oil and these fractions are withdrawn through conduit 75 and recycled through the apparatus along with the fresh charge.

This apparatus may be started in substantially the same manner as described in connection with Fig. 1 except that, in the event that sodium hydrate is used, the steam driven off may be condensed in cooler 74 and the condensate drawn off through conduit 83, valve 84 being open and valve 28 being closed.

While I have described two more or less specific modifications of my invention, it is to be understood that changes therein may be made without departing from the principles of the invention. I am not to be limited to the substances set forth for use as heating mediums, but my invention includes all similar substances having the characteristics set forth. The invention accordingly, is to be limited only by the scope of the appended claims.

What I claim is:

1. Oil treating apparatus comprising means for vaporizing oil, a fractionating tower, means for introducing the oil vapor into said fractionating tower, means for withdrawing a side stream of condensed oil from said tower, means for partially vaporizing said side stream, means for separating the vaporized and unvaporized portions of said side stream, a contact tower, means for introducing the vaporized portion into said contact tower, means for heating an auxiliary liquid inert with respect to said oil, means for introducing said auxiliary liquid into said contact tower, means in said contact tower for effecting contact between said auxiliary liquid and said vaporized portion, means for withdrawing oil vapor from said contact tower and means for introducing the withdrawn oil vapor into said fractionating tower.

2. Oil treating apparatus comprising means for vaporizing oil, a fractionating tower, means for introducing the oil vapor into said fractionating tower, means for withdrawing a side stream of condensed oil from said tower, means for partially vaporizing said side stream, means for separating the vaporized and unvaporized portions of said side stream, a cracking tower, means for introducing the vaporized portion into said cracking tower, means for heating the vaporized portion in said cracking tower, means for withdrawing vaporized portion from said cracking tower and means for introducing the withdrawn oil vapor into said fractionating tower.

3. Oil treating apparatus comprising means for vaporizing oil, a fractionating tower, means for introducing the oil vapor into said fractionating tower at an intermediate point thereof, means for withdrawing a side stream of condensed oil from said tower, means for partially vaporizing said side stream, means for separating the vaporized and unvaporized portions of said side stream, a cracking tower, means for introducing the vaporized portion into said cracking tower, means for heating the vaporized portion in said cracking tower, means for withdrawing oil vapor from said cracking tower and means for introducing the withdrawn oil vapor into said fractionating tower at a point below said intermediate point.

4. Oil treating apparatus comprising means for vaporizing oil, a fractionating tower, means for introducing the oil vapor into said fractionating tower at an intermediate point thereof, means for withdrawing a side stream of condensed oil from said tower, means for vaporizing said side stream, a contact tower, means for introducing the last-mentioned oil vapor into said contact tower, means for heating to cracking temperature an auxiliary liquid inert with respect to said oil, means for introducing said auxiliary liquid into said contact tower, means in said contact tower for effecting contact between said auxiliary liquid and said oil vapor, means for withdrawing oil vapor from said contact tower and means for introducing the withdrawn oil vapor into said fractionating tower at a point below said intermediate point.

5. The method of treating oil which comprises passing the oil through a heating zone to heat it to vaporization temperature, introducing the heated oil into a fractionating zone without substantial decomposition thereof, separating the vaporized and unvaporized portions of the oil, fractionating the vaporized portion, heating the heaviest of the liquid fractions from said vaporized portion to vaporization temperature, separating the vaporized and unvaporized portions of the heated fraction, passing the vaporized portion through a cracking zone in contact with a heated auxiliary liquid inert with respect to said oil and heated to cracking temperature, introducing vapors from the cracking zone into the fractionating zone wherein the vapors are fractionated, and withdrawing uncondensed vapors from the fractionating zone.

6. The method of treating oil which comprises passing the oil through a heating zone to heat it to vaporization temperature, introducing the heated oil into a fractionating zone without substantial decomposition thereof, separating the vaporized and unvaporized portions of the oil, fractionating the vaporized portion, heating one of the liquid fractions from said vaporized portion to vaporization temperature, separating the vaporized and unvaporized portions of the heated fraction, passing the vaporized portion through a cracking zone in contact with a heated auxiliary liquid inert with respect to said oil and heated to cracking temperature, introducing vapors from the cracking zone into the fractionating zone at a point below the point at which the aforesaid heated oil is introduced into the fractionating zone and wherein said vapors are fractionated along with the vaporized portion of the heated oil introduced into the tower, and withdrawing uncondensed vapors from the fractionating zone.

7. The method of treating oil which comprises vaporizing the oil, passing the oil vapor through zones of progressively lower temperature to condense high boiling point fractions of the oil vapor, partially vaporizing one of the condensed fractions, separating the vaporized and unvaporized portions of said fraction, heating to cracking temperature an auxiliary liquid inert with respect to said oil, cracking the vaporized portion by passing it in contact with said auxiliary liquid and introducing oil vapor obtained by the cracking into said zones of progressively lower temperature.

8. The method of treating oil which comprises vaporizing oil, passing a continuous stream of oil vapor through zones of progressively lower temperature to condense high boiling point fractions of the oil vapor, partially vaporizing one of the condensed fractions, separating the vaporized and unvaporized portions of said fraction, heating to cracking temperature an auxiliary liquid inert with respect to said oil, cracking the vaporized portion by passing it in contact with said auxiliary liquid and introducing oil vapor obtained by the cracking into said zones of progressively lower temperature and in contact with said stream of oil vapor.

9. The method of cracking hydrocarbon vapors which comprises heating in a heating zone a molten material inert with respect to said vapors to a temperature at which said vapors will be cracked, conducting the thus heated molten material to and through a cracking chamber, passing said vapors in a tortuous path through the cracking chamber and contacting said vapors flowing in a tortuous path with the heated molten material flowing countercurrent thereto in the chamber to thereby crack the vapors.

10. The method of cracking hydrocarbon vapors which comprises heating in a heating zone a molten material inert with respect to said vapors to a temperature at which said vapors will be cracked, conducting the thus heated molten material to and through a cracking chamber, passing said vapors in a tortuous path through the cracking chamber, contacting said vapors flowing in a tortuous path with the heated molten material flowing countercurrent thereto in the chamber to thereby crack the vapors, withdrawing the cracked hydrocarbon vapors from the cracking chamber, withdrawing the molten material from the cracking chamber after it has passed in direct contact with the hydrocarbon vapors, reheating it to said temperature at which said vapors will be cracked, and returning the reheated molten material to the cracking chamber for further contact with hydrocarbon vapors to be cracked.

11. The method of cracking hydrocarbon vapors which comprises heating in a heating zone a molten material inert with respect to said vapors to a temperature at which said vapors will be cracked, conducting the thus heated molten material to the upper portion of a reaction chamber, causing the molten material to flow in cascade through the reaction chamber, introducing said vapors to the lower portion of the reaction chamber, and passing the vapors upwardly through the chamber in contact with the cascading molten material to thereby crack the vapors.

COURTLANDT FORREST DENNEY.